United States Patent
Loh et al.

(10) Patent No.: US 7,026,004 B2
(45) Date of Patent: Apr. 11, 2006

(54) NON-GELLING MILK CONCENTRATES

(75) Inventors: Jimbay P. Loh, Green Oaks, IL (US); Isabelle Laye, Wheeling, IL (US); Michael Anthony Hyde, Wheeling, IL (US); Ted R. Lindstrom, Lake Forest, IL (US); Fu-I Mei, Wheeling, IL (US); Omar Diaz-Castillo, Chicago, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 377 days.

(21) Appl. No.: 10/264,861

(22) Filed: Oct. 4, 2002

(65) Prior Publication Data
US 2004/0067296 A1 Apr. 8, 2004

(51) Int. Cl.
*A23C 9/00* (2006.01)

(52) U.S. Cl. .............. 426/587; 426/491; 426/580
(58) Field of Classification Search ............ 426/478, 426/490, 491, 580, 587, 656, 657
See application file for complete search history.

(56) References Cited

U.S. PATENT DOCUMENTS

| 4,268,528 | A |  | 5/1981 | Montigny |
| 4,921,717 | A |  | 5/1990 | Ranjith |
| 5,654,025 | A |  | 8/1997 | Raghunath et al. |
| 5,707,678 | A |  | 1/1998 | Gregory |
| 6,139,901 | A | * | 10/2000 | Blazey et al. ............. 426/656 |
| 6,562,383 | B1 | * | 5/2003 | Moran et al. ............. 426/36 |
| 6,689,402 | B1 | * | 2/2004 | Nauth et al. ............. 426/36 |

* cited by examiner

*Primary Examiner*—Leslie Wong
(74) *Attorney, Agent, or Firm*—Fitch, Even, Tabin & Flannery (57) ABSTRACT

A concentrated milk derived from a dairy liquid is provided which comprises a liquid aqueous dairy product having reduced calcium levels and macromolecular milk components at about a 3.5 times or greater concentration as compared to the dairy liquid from which the concentrated milk is derived, wherein substantially all macromolecular milk components in the concentrated milk are in an uncurded state, and wherein the concentrated milk does not gel on extended refrigerated storage. The calcium-reduced 3.5× or more concentrated milk is physically stable (i.e., non-gelling) during prolonged refrigeration storage and has increased protein functionality is provided.

40 Claims, 5 Drawing Sheets

NON-GELLING MILK CONCENTRATES

FIELD OF THE INVENTION

The invention relates to non-gelling concentrated milk products and methods for producing the same.

BACKGROUND

Membrane filtration technology (e.g., microfiltration, ultrafiltration, and the like) is employed in the dairy industry to provide selective separation, concentration, and purification of protein components from a liquid dairy product such as raw milk. Membrane filtration technology comprises the steps of separating the liquid dairy product into a first liquid component (i.e., permeate or ultrafiltrate) and a second liquid component (i.e., concentrate or retenate) by placing the dairy product in contact with a semi-permeable membrane. The concentrate, which does not flow through the semi-permeable membrane, has a higher protein concentration than the first liquid component which passes through the semi-permeable membrane. In conventional ultrafiltration processes, the permeate is collected, and typically disposed of on the farm or used as livestock feed. The second liquid component or retentate is treated until a milk concentrate with the desired enriched concentration factor and/or protein content is obtained. The initial milk product is usually contacted with the semi-permeable membrane under pressure and is typically subjected to turbulent flow so as to agitate the liquid adjacent the membrane and, thereby allowing water and small molecular weight solutes (e.g., lactose) to pass through the membrane in order to obtain higher solids in the retained liquid concentrate.

On-farm ultrafiltration generally allows reduced volumes for the resulting concentrated milk products, thereby lowering shipping, storage, and refrigeration costs. Thus, milk intended for shipment is often concentrated by a factor of about 3× to obtain these benefits. Modern membrane filtration technology, however, allows efficient production of about 5× to about 6× (and higher) milk concentrate, which would, of course, allow for additional cost savings since less water would be shipped. Unfortunately, 3.5× and higher concentrates (especially 5× and higher) are likely to gel during transportation or storage. Such age gelation characteristics generally limits the use of such higher concentrated products unless special and costly handling systems (e.g., reheating prior to pumping) are available. Thus, there remains a need for improved milk concentrates which do not have such age gelation characteristics. More specifically, there remains a need for improved milk concentrates, especially 5× and greater concentrates, which are less likely to gel during transportation and/or storage at refrigeration temperatures.

Additionally, the casein protein in milk and conventionally produced concentrated or ultrafiltered milk exists as insoluble micelles. In this form, the casein is less able to function in situations where soluble proteins are desired or needed. Therefore, there remains a need for milk, and processes for preparing milk, in which casein is not present in insoluble micelles.

U.S. Pat. No. 4,268,528 (May 19, 1981) provides a process for the preparation of a cheese from ultrafiltered milk wherein the calcium content of the cheese can be accurately adjusted. Milk is coagulated by lactic fermentation to lower the pH of the milk to about 4.4 or less prior to ultrafiltration to prepare a conditioned milk substrate. The retentate obtained by ultrafiltration has essentially the same calcium content as the original milk.

U.S. Pat. No. 4,921,717 (May 1, 1990) provides a process for producing a sterilized, concentrated milk product. The process comprising partially concentrating milk or milk product (usually to about half the original volume), sterilizing the partially concentrated milk product, and further concentrating the sterilized milk product. The complete process generally provides about a 2.5 to 3-fold concentration of the original milk or milk product.

U.S. Pat. No. 5,654,025 (Aug. 5, 1997) provides a process designed to concentrate milk on the farm before shipment. The process involves cooling raw milk to below 45° F. and then directing the cooled milk through serial membrane separation units while maintaining the temperature to progressively concentrate the product in a single pass. Generally, the concentrate has about ⅓ to about ½ the volume of the original milk.

U.S. Pat. No. 5,707,678 (Jan. 13, 1998) provides a process for microfiltration of whey from milk or colostrum. The process involves separation of fat, precipitation of casein by acidification, and optional ultrafiltration of whey to reduce the calcium level in the concentrate. The resulting concentrate can be microfiltered without fouling or clogging associated with the presence of calcium phosphate or other calcium complexes. The acidification is accomplished by adding an acid such as, for example, hydrochloric acid, phosphoric acid, or lactic acid.

The current invention provides 3.5× and greater, and especially 5× and greater, concentrated milk protein concentrates and processes for producing the same. The milk protein concentrates of the current invention are truly soluble and therefore more functional than previously described milk concentrates. Furthermore, the milk concentrates of the current invention essentially eliminate the long-standing cold gelation problem associated with the handling, shipping, and storage of 3.5× and higher milk concentrates, and especially 5× and higher milk concentrates.

SUMMARY OF THE INVENTION

This invention provides a calcium-reduced 3.5× or more concentrated milk that is physically stable (i.e., non-gelling) during prolonged refrigeration storage and has increased protein functionality. In an especially preferred embodiment, this invention provides a calcium-reduced 5× or more concentrated milk that is physically stable (i.e., non-gelling) during prolonged refrigeration storage and has increased protein functionality. This stable milk concentrate is preferably produced by microfiltering or ultrafiltering (with or without diafiltering) milk, preferably skim milk, in the presence of citrate, phosphate, or other buffers. Although not wishing to be limited by theory, it appears that the citrate buffer binds calcium in the milk, thereby allowing it to be removed with lactose and other ions in the permeate stream. Thus, calcium is separated from the casein micelles in the milk protein retentate or concentrate. Native casein micelle structure is significantly disrupted as a result of partial calcium removal, thereby rendering the concentrate less likely to gel at refrigeration temperatures.

The present invention provides a concentrated milk derived from a dairy liquid, said concentrated milk comprising a liquid aqueous dairy product having reduced calcium levels and macromolecular milk components at about a 3.5 times or greater concentration as compared to the dairy liquid from which the concentrated milk is derived, wherein substantially all macromolecular milk components in the concentrated milk are in an uncurded state, and wherein the concentrated milk does not gel on extended (i.e., at least one month) refrigerated storage. If desired, the concentrated milk may be dried (e.g., freeze dried, spray dried, or the like); such dried milk product generally has a protein solubility of at least about 60 percent, preferably at least 80 percent, and most preferably at least 90 percent.

Figure 1:
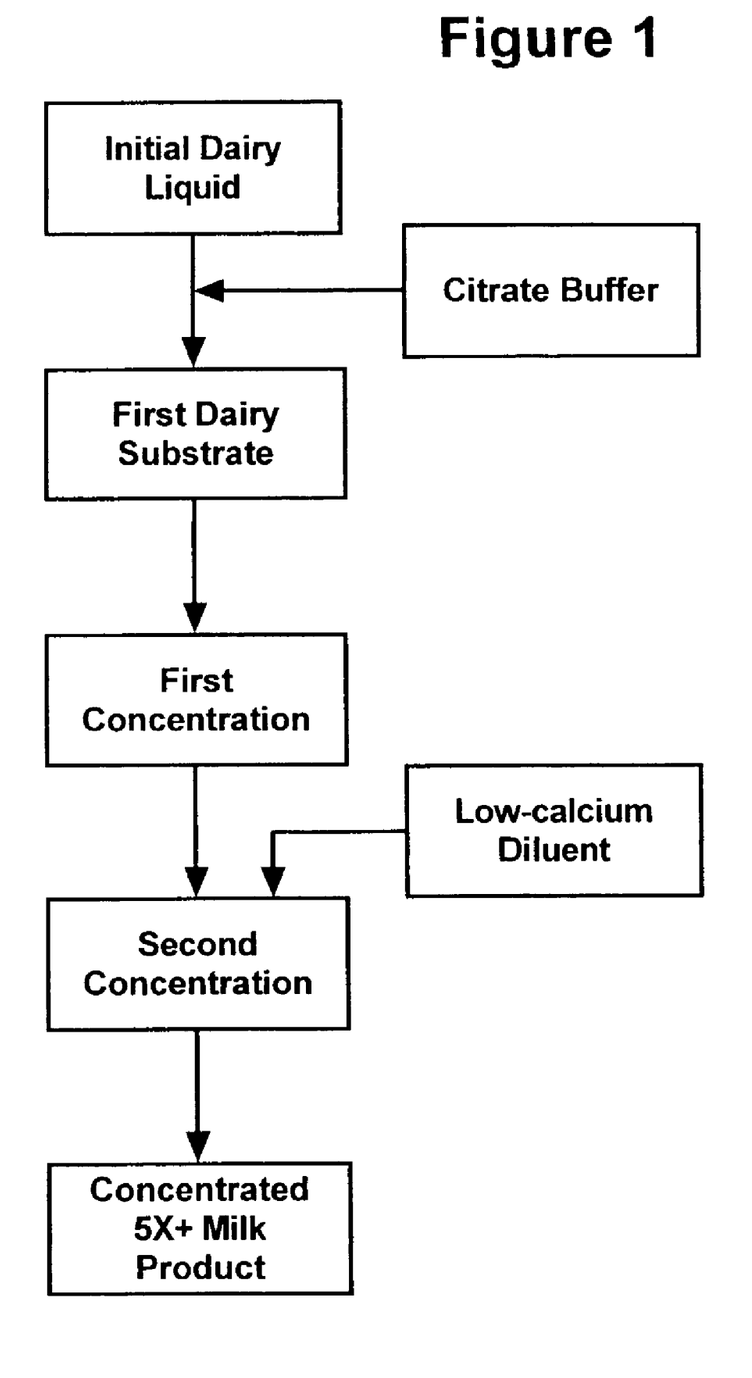
FIG. 1 provides a flow diagram generally illustrating one embodiment of the process of the present invention.

The present invention also provides a process (generally as illustrated in FIG. 1) for producing concentrated milk comprising: (1) providing an initial dairy liquid; (2) adding a calcium-binding buffer to the initial dairy liquid to form a first dairy substrate; (3) concentrating the first dairy substrate to form a partially concentrated milk; (4) diluting the partially concentrated milk with a low-calcium diluent to form a second dairy substrate; and (5) concentrating the second dairy substrate to form the concentrated milk; wherein concentrated milk has reduced calcium levels and macromolecular milk components at about a 3.5 times or greater concentration as compared to the initial dairy liquid, wherein substantially all macromolecular milk components in the concentrated milk are in an uncurded state, and wherein the concentrated milk does not gel on extended refrigerated storage.

Figure 2:
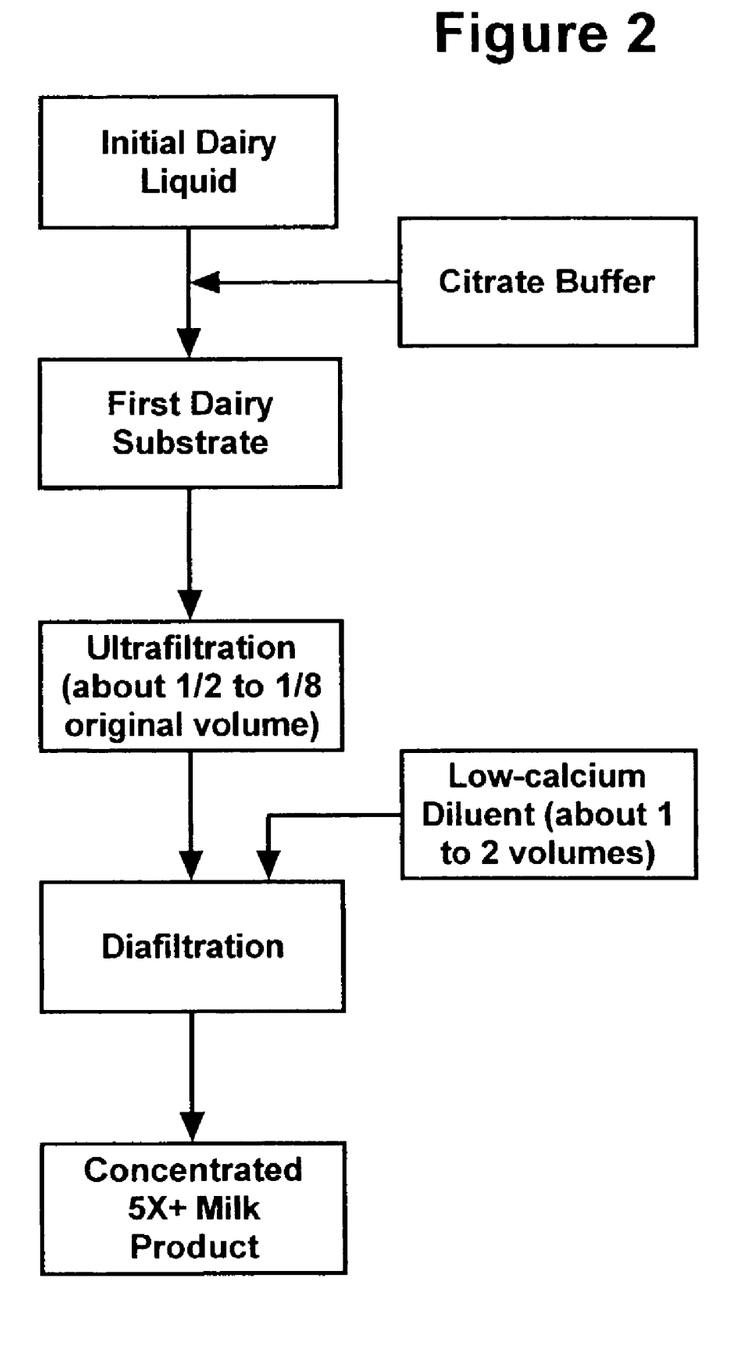
FIG. 2 provides a flow diagram illustrating a preferred embodiment of the process according to the embodiment of FIG. 1.

In a preferred embodiment, the present invention also provides a process (generally as illustrated in FIG. 2) for producing concentrated milk comprising: (1) providing an initial dairy liquid; (2) adding a calcium-binding buffer to the initial dairy liquid to form a first dairy substrate; (3) concentrating the first dairy substrate using ultrafiltration to form a partially concentrated milk; (4) diluting the partially concentrated milk with a low-calcium diluent to form a second dairy substrate; and (5) concentrating the second dairy substrate using diafiltration to form the concentrated milk; wherein concentrated milk has reduced calcium levels and macromolecular milk components at about a 3.5 times or greater concentration as compared to the initial dairy liquid, wherein substantially all macromolecular milk components in the concentrated milk are in an uncurded state, and wherein the concentrated milk does not gel on extended refrigerated storage.

Figure 3:
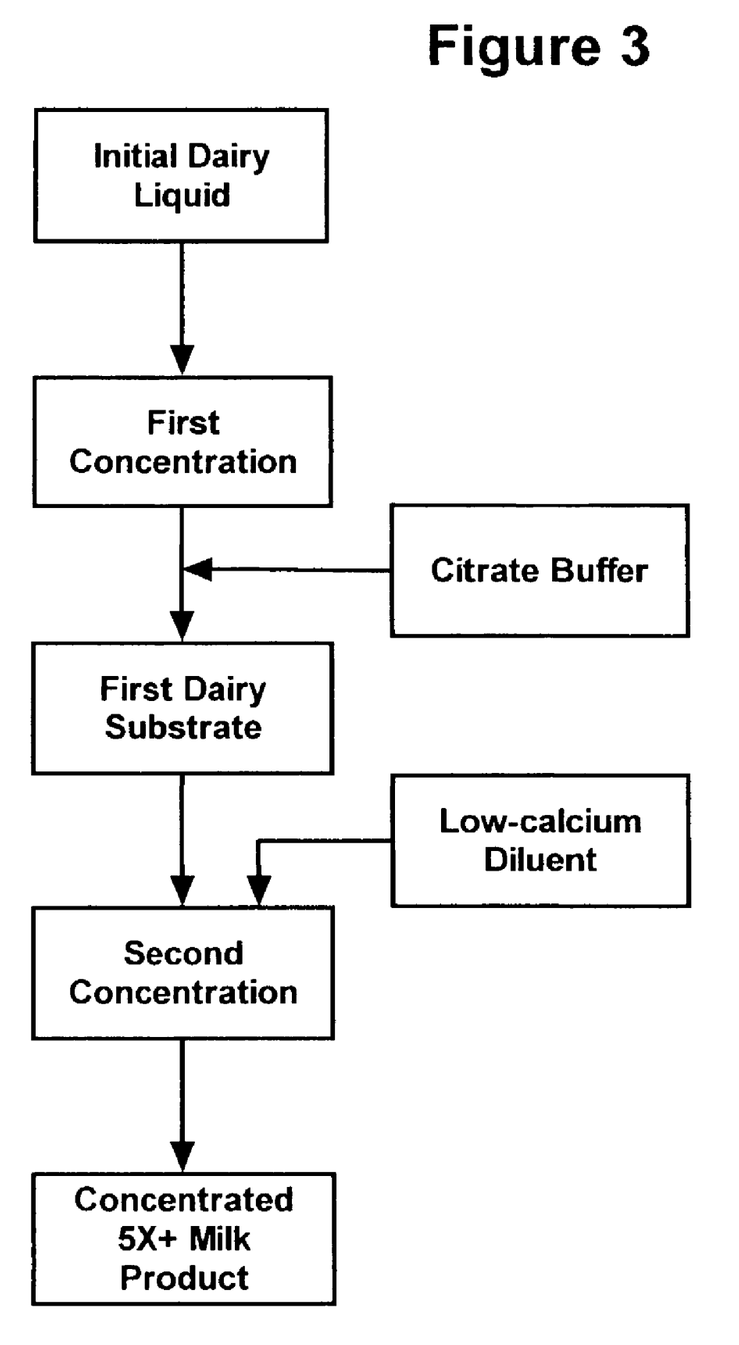
FIG. 3 provides a flow diagram generally illustrating another embodiment of the process of the present invention.

The present invention also provides a process (generally as illustrated in FIG. 3) for producing concentrated milk comprising: (1) providing an initial dairy liquid; (2) concentrating the initial dairy substrate to form a partially concentrated milk a first dairy substrate; (3) adding a calcium-binding buffer to the partially concentrated milk to form a first dairy substrate; (4) diluting the first dairy substrate with a low-calcium diluent to form a second dairy substrate; and (5) concentrating the second dairy substrate to form the concentrated milk; wherein concentrated milk has reduced calcium levels and macromolecular milk components at about a 3.5 times or greater concentration as compared to the initial dairy liquid, wherein substantially all macromolecular milk components in the concentrated milk are in an uncurded state, and wherein the concentrated milk does not gel on extended refrigerated storage.

Figure 4:
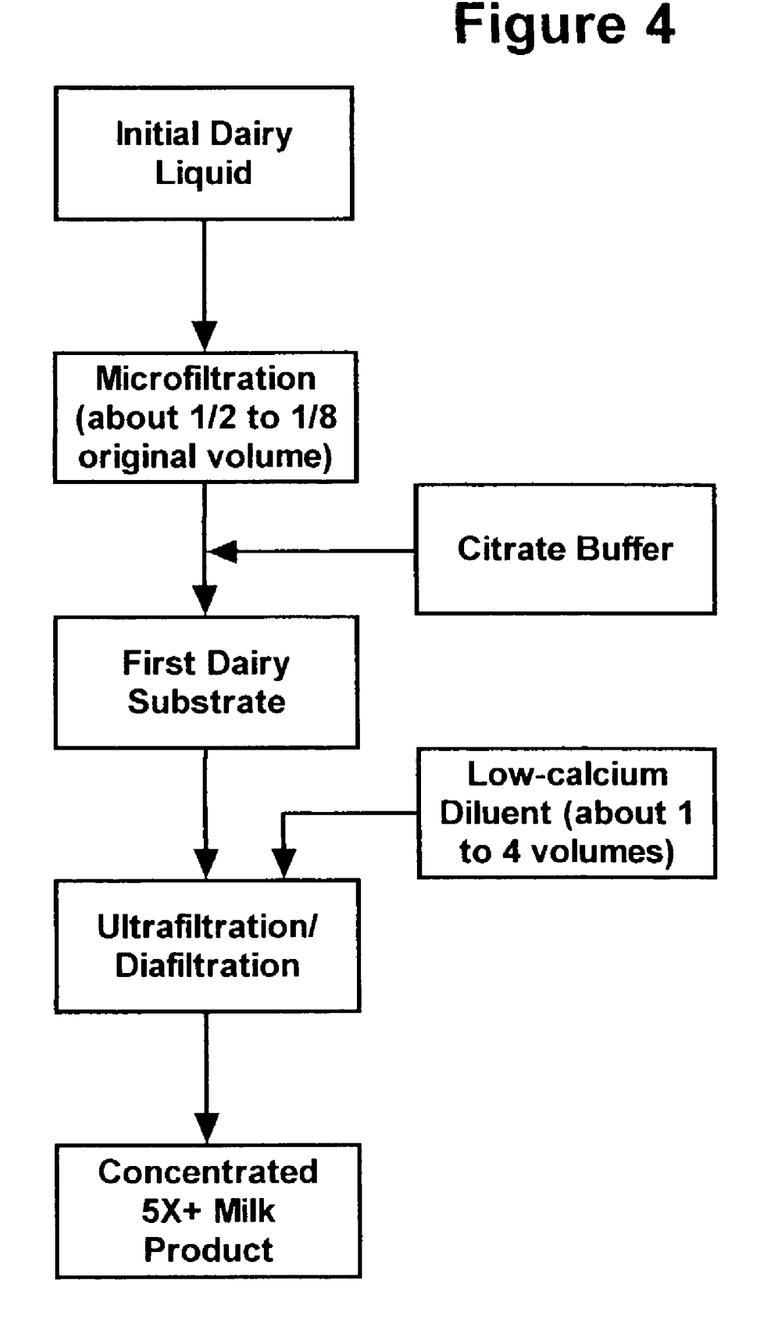
FIG. 4 provides a flow diagram illustrating a preferred embodiment of the process according to the embodiment of FIG. 3.

In another preferred embodiment, the present invention also provides a process (generally as illustrated in FIG. 4) for producing concentrated milk comprising: (1) providing an initial dairy liquid; (2) concentrating the initial dairy liquid using microfiltration to form a partially concentrated milk; (3) adding a calcium-binding buffer to the partially concentrated milk to form a first dairy substrate; (4) diluting the first dairy substrate with a low-calcium diluent to form a second dairy substrate; and (5) concentrating the second dairy substrate using ultrafiltration and diafiltration to form the concentrated milk; wherein concentrated milk has reduced calcium levels and macromolecular milk components at about a 3.5 times or greater concentration as compared to the initial dairy liquid, wherein substantially all macromolecular milk components in the concentrated milk are in an uncurded state, and wherein the concentrated milk does not gel on extended refrigerated storage.

DESCRIPTION OF THE PREFERRED EMBODIMENTS

The current invention provides about 3.5× and greater, preferably about 5× to about 6.5×, milk concentrates having reduced calcium levels which do not gel upon refrigerated storage. These 3.5× and greater milk concentrates include substantially all macromolecular milk components in an uncurded state. Typically, the milk concentrates are prepared using a calcium-binding buffer. Preferably, this buffer is a citrate buffer, most preferably a citrate buffer containing between 0 and about 6 percent citric acid and between about 15 and 30 percent alkaline earth citrate (preferably trisodium citrate) and having a pH of about 6 to about 7.

The milk concentrates of the current invention may be produced using novel processes of the current invention. FIG. 1 provides general overview of one embodiment of the process of the present invention for making milk concentrates. In general, the process includes adding an effective amount of a calcium-binding buffer to an initial dairy liquid (e.g., full-fat, reduced-fat, or skim milk). The initial dairy liquid and calcium-binding buffer mixture is then concentrated to a first reduced volume, typically about ½ to ⅛ the original volume of milk. The partially concentrated milk preferably is then diluted with a low-calcium diluent, preferably by adding a volume of low-calcium diluent that is at least equal to the first reduced volume, and concentrated to a final volume of at most about ⅕ to about ⅙.₅ volume of the original or initial dairy liquid. The first concentration step is preferably carried out using ultrafiltration. The second concentration step is preferably carried out using a buffer exchange method, preferably diafiltration. Milk concentrates produced using this process do not exhibit significant gelation upon extended refrigerated storage. FIG. 2, illustrates a preferred embodiment of the current invention based on the general process of FIG. 1.

FIG. 3 provides general overview of another embodiment of the process of the present invention for making milk concentrates. In general, the process includes concentrating an initial dairy liquid (e.g., full-fat, reduced-fat, or skim milk), to a first reduced volume (typically to about ½ to ⅛ the original volume of *milk*) and then adding an effective amount of a *calcium-binding* buffer to form a first dairy *substrate*. The first dairy substrate is then diluted with a *low-calcium diluent*, preferably by adding a volume of low-calcium diluent that is at least equal to the first reduced volume, and concentrated to a final volume of at most about 1/5 to about 1/6.5 volume of the original or initial dairy liquid. The first concentration step is preferably carried out using microfiltration. The second concentration step is preferably carried out using a buffer exchange method, preferably ultrafiltration combined with diafiltration. Milk concentrates produced using this process do not exhibit significant gelation upon extended refrigerated storage. FIG. 4, illustrates a preferred embodiment of the current invention based on the general process of FIG. 3.

The initial dairy liquid employed in the present invention may originate from any lactating livestock animal whose milk is useful as a source of human food. Such livestock animals include, by way of non-limiting example, cows, buffalo, other ruminants, goats, sheep, and the like. Generally, however, cows' milk is the preferred milk used in the practice of the invention. The milk used as starting material for the processes of the current invention may be whole milk, low-fat milk, or skim milk.

As discussed above, the current invention typically involves by adding an effective amount of a calcium-binding buffer to milk (FIGS. 1 and 2) or concentrated milk (FIGS. 3 and 4). Any buffer which binds calcium can be used with the current invention. Examples of calcium-binding buffers include citrate and phosphate buffers. In preferred embodiments, a citrate buffer is used. A preferred citrate buffer is an aqueous solution containing between 0 and about 6 percent citric acid and between about 15 and 30 percent alkaline earth citrate (preferably trisodium citrate) and having a pH of about 6 to about 7. An especially preferred citrate buffer is an aqueous solution containing about 3 to about 3.5 percent citric acid and about 20 to about 25 percent alkaline earth citrate (preferably trisodium citrate) and having a pH of about 6 to about 7 and even more preferably about 6.4 to about 6.8.

The effective amount of the calcium binding buffer varies depending on the milk or concentrated milk and the calcium binding capacity of the buffer. In general, the effective amount is an amount that reduces calcium concentration in the milk or concentrated milk to reduced levels, as defined below, after the processing described herein. Generally, the amount of citrate buffer added to the initial undiluted liquid milk product (see FIGS. 1 and 2) is about 1 to about 6 percent and preferably about 2 to about 4 percent. Generally, the amount of citrate buffer added to the first concentrated liquid milk product (see FIGS. 3 and 4) is about 2 to about 4 percent and preferably about 4 to about 24 percent.

Two concentration steps are typically employed in the present process. In a first concentration step of the process of FIG. 1, the initial dairy liquid with added calcium-binding buffer is concentrated to a first reduced volume, typically about 3/4 to about 1/8 the original volume of milk, preferably, about 1/2 to about 1/4 the original volume of milk. In a second concentration step, the partially concentrated milk, after dilution with the low calcium diluent, is further concentrated to about 1/4 to about 1/8 the original volume of the milk, preferably 1/5 to about 1/6 the original volume of the milk. In a first concentration step of the process of FIG. 3, the initial dairy liquid is concentrated to a first reduced volume, typically about 3/4 to about 1/8 the original volume of milk, preferably, about 1/2 to about 1/4 the original volume of milk. After adding the citrate buffer and the low calcium diluent, a second concentration step is used to further concentrate the resulting mixture to about 1/4 to about 1/8 the original volume of the milk, preferably 1/5 to 1/6 the original volume of the milk.

In the preferred embodiment of FIG. 3, the first concentration step is performed using ultrafiltration. Methods for ultrafiltering dairy liquids are well known in the art of food processing. In preferred embodiments, the ultrafiltration is performed using conventional ultrafiltration equipment with a filter with a cutoff of less than 20,000 molecular weight, most preferably a cutoff of about 10,000 molecular weight. More preferably, spiral wound membrane filters are used. The filter's cutoff is preferably sufficient to assure that substantially all macromolecular milk components are retained in the milk concentrate.

Ultrafiltration is typically carried out with a baseline pressure of about 25 to about 65 psi and a temperature of about 45 to about 55° C. The ultrafiltration may be carried out with any configuration of modules currently known in milk ultrafiltration. For example, modules using two membrane elements can be used in pairs as a filtration stage. Generally, ultrafiltration processes using 1 to 6 filtration stages can be used.

After the milk with added calcium-binding buffer is concentrated in a first concentration step, it is diluted with at least about one volume of a low calcium diluent to form a partially concentrated milk having reduced calcium levels. A low calcium diluent is a diluent in which calcium concentrations are no greater than 0.1× the reduced calcium levels of concentrated milk according to the current invention, as defined below. Preferably the low calcium diluent contains no calcium. The diluent can be any solution used in milk processing that does not change the functionality of milk provided it meets the low calcium requirements discussed above. For example, the diluent may be membrane filtration permeate (e.g., microfiltration permeate, ultrafiltration permeate), liquid whey, or water. Preferably, the diluent is water.

Preferably, the second concentration step in the process illustrated in FIGS. 1 and 2 is performed using a buffer exchange method. In preferred embodiments, the buffer exchange method is diafiltration. Preferably, the weight of the substrate is kept about constant throughout the dilution process by continuous addition of the low calcium diluent. Methods for diafiltering dairy liquids are well known in the art of food processing. In preferred embodiments, the diafiltration is performed using the same filter and under the same conditions as used for the ultrafiltration step, except that diluent is fed into the diafiltration system. Preferably, the diafiltration and ultrafiltration steps are performed in the same system without disruption.

In the preferred embodiment shown in FIG. 4, the first concentration step is performed using microfiltration. Methods for microfiltering dairy liquids are well known in the art of food processing. In preferred embodiments, the microfiltration is performed using conventional microfiltration equipment with ceramic membrane filters with an average pore size of 0.2 micrometer or less, preferably 0.1 micrometer. The filter's average pore size is preferably sufficient to assure that substantially some macromolecular milk components are retained in the milk concentrate.

Microfiltration is typically carried out under a uniform trans-membrane pressure of about 0.1 to about 0.5 bars and a temperature of about 45 to about 55° C. The microfiltration may be carried out with any configuration of modules currently known in milk microfiltration. For example, modules using 1 to 36 membrane elements can be used as a filtration stage. Preferably the microfiltration process uses 1 to 5 filtration stages.

After the milk is concentrated in the first concentration step, an effective amount of a calcium-binding buffer is added to the partially concentrated milk. It is then diluted with at least about one volume of a low calcium diluent to form a partially concentrated milk having reduced calcium levels. A low calcium diluent is a diluent in which calcium concentrations are no greater than 0.1× the reduced calcium levels of concentrated milk according to the current invention, as defined below. Preferably the low calcium diluent contains no calcium. The diluent can be any solution used in milk processing that does not change the functionality of milk provided it meets the low calcium requirements discussed above. For example, the diluent may be membrane filtration permeate (e.g. microfiltration permeate, ultrafiltration permeate), liquid whey, or water. Preferably, the diluent is water.

Preferably, the second concentration step in FIG. 3 is to performed using a buffer exchange method. In preferred embodiments, the buffer exchange method is microfiltration combined with diafiltration. Preferably, the weight of the substrate is kept about constant throughout the dilution process by continuous addition of the low calcium diluent. Methods for diafiltering dairy liquids are well known in the art of food processing. In preferred embodiments, the diafiltration is performed using the same filter and under the same conditions as used for the ultrafiltration step, except that diluent is fed into the diafiltration system. Preferably, the diafiltration and ultrafiltration steps are performed in the same system without disruption.

Figure 5:
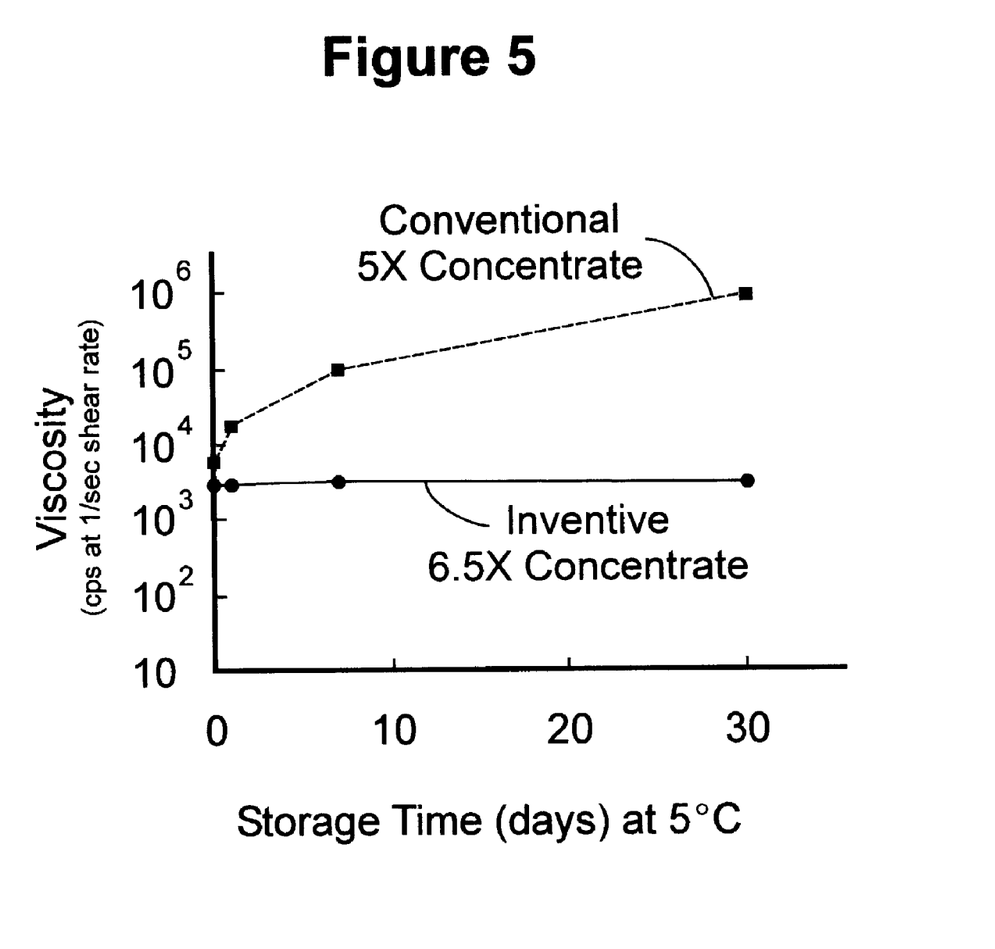
FIG. 5 compares the gelling characteristics of a conventionally prepared 5× milk concentrate with a 6.5× milk concentrate prepared using the present invention during storage at about 5° C.

Skim milk generally contains about 1,200 ppm calcium and about 3.6 percent protein. For purposes of this invention, "reduced calcium levels" are calcium levels below about 1000 ppm (i.e., generally at least about a 15 percent reduction or more), and preferably below about 600 ppm (i.e., about a 50 percent reduction or more). Since the protein levels are essentially unchanged in the practice of this invention, such reduced calcium levels a calcium to protein ratio in the final concentrated milk of less than about 0.03, and preferably less than about 0.015. For purposes of this invention, "extended refrigerated storage" is storage for time periods in which conventionally (generally about 3.5× to about 5× milk concentrates) form a gel under refrigeration temperatures (i.e., about 2 to about 8° C.). Typically such time periods for such conventionally prepared products are from about 2 to about 24 hours. Milk gels that form upon refrigerated storage of conventional 3.5× or greater (and especially 5× or greater) milk concentrates are well known in the art. FIG. 5 compares the gelling characteristics of a conventionally prepared 5× milk concentrate with a 6.5× milk concentrate prepared using the present invention. As can be seen in FIG. 5, the viscosity of the inventive milk concentrate remains essentially unchanged even after one month at refrigerated temperatures; typically viscosity changes are not observed even after about 4 months.

As used herein, "casein" relates to any, or all, of the phosphoproteins in milk, and to mixtures of any of them. An important characteristic of casein is that it forms micelles in naturally occurring milk and in the dairy liquids employed in the present invention. Many casein components have been identified, including, but not limited to, α-casein (including $\alpha_{s1}$-casein and $\alpha_{s2}$-casein), β-casein, κ-casein, and their genetic variants.

The milk concentrates produced according to this invention are ideally suited for transportation for further processing (e.g., conversion to cheese or other dairy product) since they have a significantly reduced tendency to gel during prolonged refrigerated storage. If desired, these milk concentrates may be freeze-dried and stored in a dried state. Such dried milk concentrates retain the improved protein functionality described herein and allow for increased storage times before further processing.

The following examples describe and illustrate the processes and products of the invention. These examples are intended to be merely illustrative of the present invention, and not limiting thereof in either scope or spirit. Unless indicated otherwise, all percentages and ratios are by weight. Those skilled in the art will readily understand that variations of the materials, conditions, and processes described in these examples can be used. All references cited herein are incorporated by reference.

EXAMPLE 1

This example provides an embodiment of the process of the present invention according to FIGS. 1 and 2. Citrate buffer (24 lbs; 3.2 percent citric acid, 21.5 percent trisodium citrate, 75.3 percent water) was added to 600 lbs. of pasteurized skim milk at about 49° C. The milk and buffer solution (about 49° C.) was ultrafiltered with a 10,000 molecular weight cut-off membrane to a concentration factor of three. The retentate was then diafiltered with two volumes of water at constant weight, and then further concentrated to a final concentration factor of six.

The resulting concentrate contained about 13.5 percent protein with a casein to whey protein ratio of about 80/20, about 1020 ppm calcium, and a calcium to protein ratio of about 0.008. The milk concentrates did not gel upon refrigerated storage (i.e., about 2 to about 8° C.) even after about 10 weeks. In contrast and as illustrated in FIG. 5, a similar but conventionally prepared concentrate would be expected to gel within about 24 hours at 4° C.

The final concentrates made according to the current invention also had improved protein solubility. After freeze-drying, the resulting solid powder was reconstituted in 0.1 M NaCl to make a 3 percent protein solution. The protein solubility obtained with concentrates of the present invention was about 95 percent at pH 7. In comparison, a control concentrate (i.e., prepared in essentially the same manner without the citrate buffer) had only about 27 percent protein solubility and did gel.

EXAMPLE 2

This example provides another embodiment of the process of the present invention according to FIGS. 3 and 4. Pasteurized skim milk (3000 lbs.) pounds was microfiltered in a Tetra Pak microfiltration system consisting of 4 stages, wherein each stage contained 7 ceramic membrane elements with an average pore size of 0.1 micrometer, with a total membrane area of about 9 $m^2$. The skim milk was microfiltered to a concentration factor of about three at a feed rate of 30 lbs per minute, a processing temperature of 49° C., and an average uniform trans-membrane pressure of 0.3 bars. Citrate buffer (126 lbs; 3.2 percent citric acid, 21.5 percent trisodium citrate, 75.3 percent water; pH 5.7; Brix reading: 23.5 percent; temperature about 25° C.) was added to 1030 lbs of the microfiltration retentate (Brix Reading: 16 percent; 14 percent total solids, pH 6.7, temperature about 49° C.). The microfiltration retentate and buffer were then diafiltered and ultrafiltered with three volumes of water at a discontinuous rate in a four-stage NIRO ultrafiltration system containing two modules per stage (total membrane area of about 107 m$^2$). Each module contained 2 spiral wound (KOCH) membrane elements with a 10,000 molecular weight cut-off value. The buffered milk concentrate was ultrafiltrated to a concentration factor of 6.85 (corresponding to a concentration factor of 5 based on the whole process). The buffered milk was fed at a rate of 7.7 gallons per minute, with a Brix reading of 4.5 percent. The processing temperature was about 42° C. and the baseline pressure was about 65 psi. The same unit was used for the diafiltration and ultrafiltration processes.

The final concentrate contained about 80 percent protein on a dry basis with a casein to whey protein ratio of about 90/10, about 9400 ppm of calcium on a dry basis, and a calcium to protein ratio of about 0.012. The milk concentrates did not gel upon refrigerated storage (i.e., about 2 to about 8° C.) even after about 10 weeks. In contrast and as illustrated in FIG. 5, a similar but conventionally prepared concentrate would be expected to gel within about 24 hours at 4° C.

The final concentrates also had improved protein solubility. A spray-dried concentrate reconstituted in 0.1 M NaCl to make a 3 percent protein solution had a protein solubility of about 99 percent at pH 7; this compares to about 30 percent for a control sample.

What is claimed is:

1. A process for producing concentrated milk comprising:
   (1) providing an initial dairy liquid;
   (2) adding a calcium-binding buffer to the initial dairy liquid to form a first dairy substrate;
   (3) concentrating the first dairy substrate to form a partially concentrated milk;
   (4) diluting the partially concentrated milk with a low-calcium diluent to form a second dairy substrate; and
   (5) concentrating the second dairy substrate to form the concentrated milk;
   wherein the concentrated milk has reduced calcium levels and macromolecular milk components at about a 3.5 times or greater concentration as compared to the initial dairy liquid, wherein the concentrated milk is in an ungelled state, and wherein the concentrated milk does not gel on extended refrigerated storage.

2. The process of claim 1, wherein the concentrated milk has macromolecular milk components at about a 5 times or greater concentration as compared to the initial dairy liquid.

3. The process of claim 2, wherein the concentrating of the first dairy substrate is effected with ultrafiltration and the concentrating of the second dairy substrate is effected with diafiltration.

4. The process of claim 3, wherein both the ultrafiltration and the diafiltration are carried out in a single processing unit.

5. The process of claim 2, wherein the calcium-binding buffer is a citrate buffer.

6. The process of claim 3, wherein the calcium-binding buffer is a citrate buffer.

7. The process of claim 5, wherein the citrate buffer comprises from 0 to about 6 percent citric acid and about 15 to 30 percent alkaline earth citrate in an aqueous medium.

8. The process of claim 6, wherein the citrate buffer comprises from 0 to about 6 percent citric acid and about 15 to 30 percent alkaline earth citrate in an aqueous medium.

9. The process of claim 5, wherein the citrate buffer comprises from about 3 to about 3.5 percent citric acid and about 20 to about 25 percent trisodium citrate in an aqueous medium.

10. The process of claim 6, wherein the citrate buffer comprises from about 3 to about 3.5 percent citric acid and about 20 to about 25 percent trisodium citrate in an aqueous medium.

11. The method of claim 2, wherein the first dairy substrate is concentrated by a factor of about 2× to about 4× and partially concentrated milk is diluted with about 1 to about 3 volumes of the low-calcium diluent.

12. The method of claim 8, wherein the first dairy substrate is concentrated by a factor of about 2× to about 4× and partially concentrated milk is diluted with about 1 to about 3 volumes of the low-calcium diluent.

13. A process for producing concentrated milk comprising:
   (1) providing an initial dairy liquid;
   (2) adding a calcium-binding buffer to the initial dairy liquid to form a first dairy substrate;
   (3) concentrating the first dairy substrate using ultrafiltration to form a partially concentrated milk;
   (4) diluting the partially concentrated milk with a low-calcium diluent to form a second dairy substrate; and
   (5) concentrating the second dairy substrate using diafiltration to form the concentrated milk;
   wherein the concentrated milk has reduced calcium levels and macromolecular milk components at about a 3.5 times or greater concentration as compared to the initial dairy liquid, wherein the concentrated milk is in an ungelled state, and wherein the concentrated milk does not gel on extended refrigerated storage.

14. The process of claim 13, wherein the concentrated milk has reduced calcium levels and macromolecular milk components at about a 5 times or greater concentration as compared to the initial dairy liquid.

15. The process of claim 14, wherein the calcium-binding buffer is a citrate buffer which is added to the partially concentrated milk at a level of about 2 to about 4 percent.

16. The process of claim 14, wherein the calcium-binding buffer is a citrate buffer which is added to the partially concentrated milk at a level of about 3 to about 3.4 percent.

17. The process of claim 15 wherein the citrate buffer comprises 0 to about 6 percent citric acid and about 15 to 30 percent alkaline earth citrate in an aqueous medium.

18. The process of claim 15, wherein the citrate buffer comprises from about 3 to about 3.5 percent citric acid and about 20 to about 25 percent trisodium citrate in an aqueous medium.

19. The process of claim 14, wherein the low-calcium diluent is water.

20. The method of claim 14, wherein the first dairy substrate is concentrated by a factor of about 2× to about 4× and partially concentrated milk is diluted with about 1 to about 3 volumes of the low-calcium diluent.

21. The method of claim 15, wherein the first dairy substrate is concentrated by a factor of about 2× to about 4× and partially concentrated milk is diluted with about 1 to about 3 volumes of the low-calcium diluent.

22. The method of claim 16, wherein the first dairy substrate is concentrated by a factor of about 2× to about 4× and partially concentrated milk is diluted with about 1 to about 3 volumes of the low-calcium diluent.

23. The method of claim 19, wherein the first dairy substrate is concentrated by a factor of about 2× to about 4× and partially concentrated milk is diluted with about 1 to about 3 volumes of the low-calcium diluent.

24. A process for producing concentrated milk comprising:

(1) providing an initial dairy liquid;
(2) concentrating the initial dairy substrate to form a partially concentrated milk a first dairy substrate;
(3) adding a calcium-binding buffer to the partially concentrated milk to form a first dairy substrate;
(4) diluting the first dairy substrate with a low-calcium diluent to form a second dairy substrate; and
(5) concentrating the second dairy substrate to form the concentrated milk;
wherein concentrated milk has reduced calcium levels and macromolecular milk components at about a 3.5 times or greater concentration as compared to the initial dairy liquid, wherein the concentrated milk is in an ungelled state, and wherein the concentrated milk does not gel on extended refrigerated storage.

25. The process of claim 24, wherein the concentrated milk has macromolecular milk components at about a 5 times or greater concentration as compared to the initial dairy liquid.

26. The process of claim 24, wherein the concentrating of the initial dairy substrate is effected with microfiltration and the concentrating of the second dairy substrate is effected with ultrafiltration combined with diafiltration.

27. The process of claim 24, wherein the calcium-binding buffer is a citrate buffer.

28. The process of claim 26, wherein the calcium-binding buffer is a citrate buffer.

29. The process of claim 27, wherein the citrate buffer comprises from 0 to about 6 percent citric acid and about 15 to 30 percent alkaline earth citrate in an aqueous medium.

30. The process of claim 28, wherein the citrate buffer comprises from 0 to about 6 percent citric acid and about 15 to 30 percent alkaline earth citrate in an aqueous medium.

31. The process of claim 27, wherein the citrate buffer comprises from about 3 to about 3.5 percent citric acid and about 20 to about 25 percent trisodium citrate in an aqueous medium.

32. The process of claim 28, wherein the citrate buffer comprises from about 3 to about 3.5 percent citric acid and about 20 to about 25 percent trisodium citrate in an aqueous medium.

33. A process for producing concentrated milk comprising:
(1) providing an initial dairy liquid;
(2) concentrating the initial dairy liquid using microfiltration to form a partially concentrated milk;
(3) adding a calcium-binding buffer to the partially concentrated milk to form a first dairy substrate;
(4) diluting the first dairy substrate with a low-calcium diluent to form a second dairy substrate; and
(5) concentrating the second dairy substrate using ultrafiltration and diafiltration to form the concentrated milk; wherein concentrated milk has reduced calcium levels and macromolecular milk components at about a 3.5 times or greater concentration as compared to the initial dairy liquid, wherein the concentrated milk is in an ungellded state, and wherein the concentrated milk does not gel on extended refrigerated storage.

34. The process of claim 33, wherein the concentrated milk has macromolecular milk components at about a 5 times or greater concentration as compared to the initial dairy liquid.

35. The process of claim 33, wherein the calcium-binding buffer is a citrate buffer.

36. The process of claim 34, wherein the calcium-binding buffer is a citrate buffer.

37. The process of claim 33, wherein the citrate buffer comprises from 0 to about 6 percent citric acid and about 15 to 30 percent alkaline earth citrate in an aqueous medium.

38. The process of claim 34, wherein the citrate buffer comprises from 0 to about 6 percent citric acid and about 15 to 30 percent alkaline earth citrate in an aqueous medium.

39. The process of claim 33, wherein the citrate buffer comprises from about 3 to about 3.5 percent citric acid and about 20 to about 25 percent trisodium citrate in an aqueous medium.

40. The process of claim 34, wherein the citrate buffer comprises from about 3 to about 3.5 percent citric acid and about 20 to about 25 percent trisodium citrate in an aqueous medium.

* * * * *